(12) United States Patent
Cai et al.

(10) Patent No.: US 8,011,559 B2
(45) Date of Patent: Sep. 6, 2011

(54) ACTIVE MATERIAL-AUGMENTED VIBRATION WELDING SYSTEM AND METHOD OF USE

(75) Inventors: Wayne W. Cai, Troy, MI (US); Xiujie Gao, Troy, MI (US); Nancy L. Johnson, Northville, MI (US); Alan L. Browne, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 47 days.

(21) Appl. No.: 12/614,462

(22) Filed: Nov. 9, 2009

(65) Prior Publication Data

US 2011/0108184 A1    May 12, 2011

(51) Int. Cl.
*B23K 1/06* (2006.01)
*B23K 20/12* (2006.01)

(52) U.S. Cl. ..... 228/110.1; 228/1.1; 228/2.1; 228/112.1
(58) Field of Classification Search .......... None
See application file for complete search history.

(56) References Cited

U.S. PATENT DOCUMENTS

| | | | | |
|---|---|---|---|---|
| 3,831,262 A * | 8/1974 | Luc | | 228/110.1 |
| 4,227,959 A * | 10/1980 | Brown | | 156/515 |
| 5,198,066 A * | 3/1993 | Cederstrom | | 156/538 |
| 5,493,372 A * | 2/1996 | Mashtare et al. | | 399/313 |
| 5,890,643 A * | 4/1999 | Razon et al. | | 228/1.1 |
| 6,135,339 A * | 10/2000 | Parrini | | 228/1.1 |
| 6,153,035 A * | 11/2000 | Van Laeken | | 156/73.5 |
| 6,523,732 B1 * | 2/2003 | Popoola et al. | | 228/1.1 |
| 7,249,702 B2 * | 7/2007 | Mironescu et al. | | 228/4.5 |
| 7,462,960 B2 * | 12/2008 | Or et al. | | 310/26 |
| 2003/0066863 A1 * | 4/2003 | Skogsmo et al. | | 228/111.5 |
| 2004/0191620 A1 * | 9/2004 | Miyahisa et al. | | 429/176 |
| 2006/0225842 A1 * | 10/2006 | Darcy et al. | | 156/580.1 |
| 2010/0065613 A1 * | 3/2010 | Nasu et al. | | 228/110.1 |
| 2011/0018368 A1 * | 1/2011 | Hirnschal et al. | | 310/26 |

* cited by examiner

*Primary Examiner* — Kiley Stoner
(74) *Attorney, Agent, or Firm* — Quinn Law Group, PLLC

(57) ABSTRACT

A method for controlling welding forces of a weld tip to a work piece during a vibration-welding process includes positioning an Active Material (AM) element adjacently to a welding interface, and varying a property of the AM element to regulate the welding force. The AM element may be disposed between the weld tip and a weld face thereof, or between the work piece and an anvil. The property may be varied as a function of heat generated by the welding process. A property of each of a plurality of AM elements may be independently and selectively varied via an energy source, or passively. A vibration welding system includes a weld tip and an AM element connected adjacently to a welding interface. The system regulates a welding force applied by the weld tip to a work piece during the welding process by varying a property of the AM element.

18 Claims, 4 Drawing Sheets

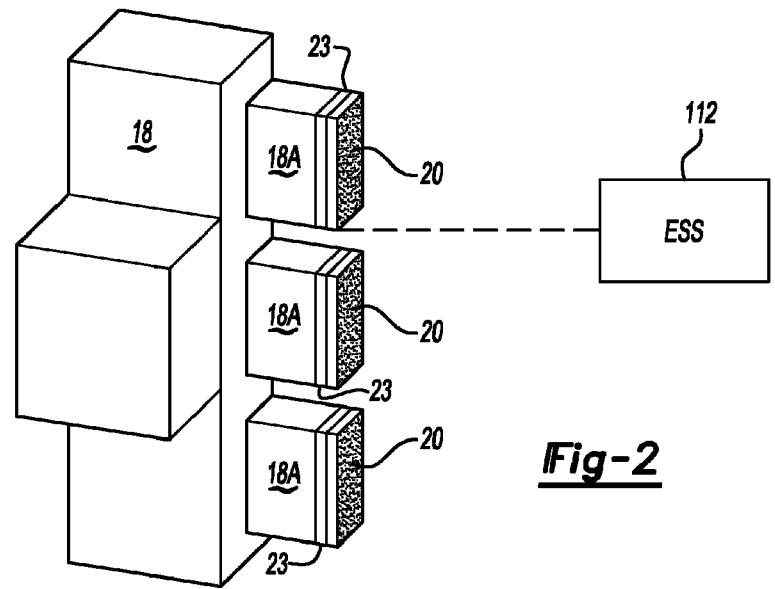
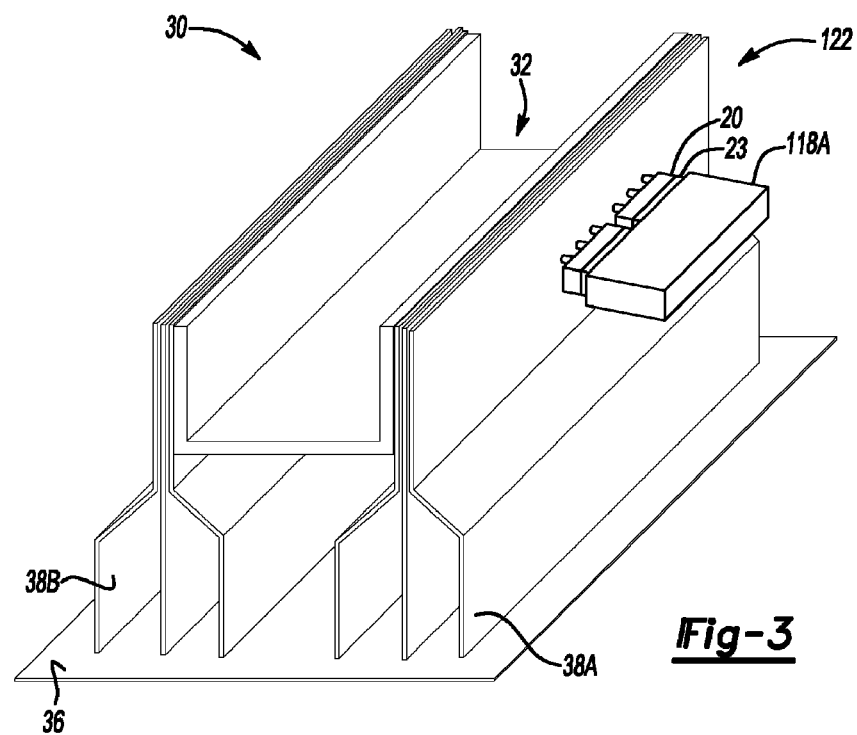

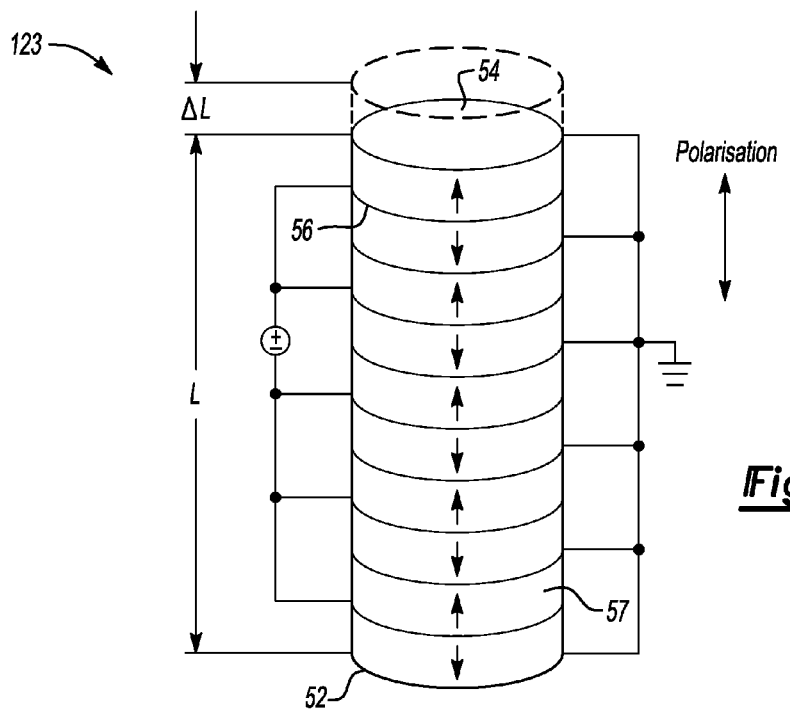
*Fig-4A*
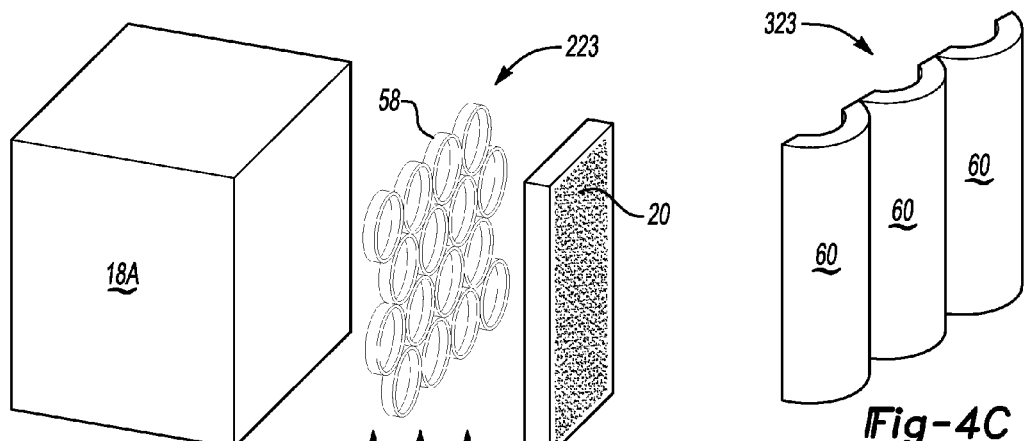
*Fig-4B*  *Fig-4C*
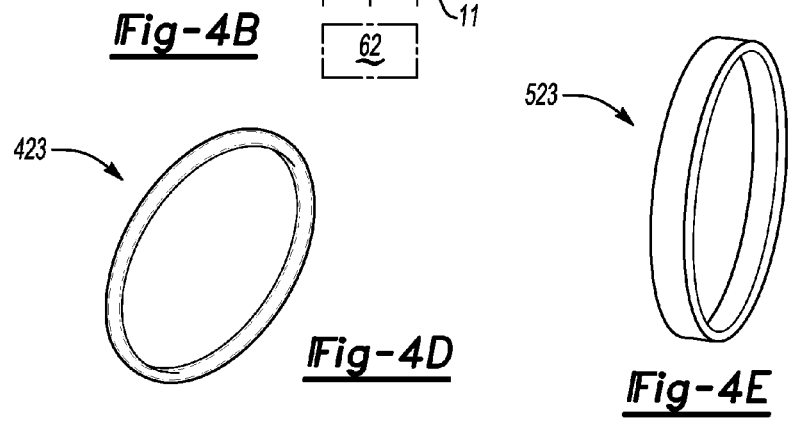
*Fig-4D*  *Fig-4E*

ACTIVE MATERIAL-AUGMENTED VIBRATION WELDING SYSTEM AND METHOD OF USE

TECHNICAL FIELD

The invention relates generally to the process of vibration welding, and in particular to a system and a method for independently-adjusting and regulating the welding force applied by weld tips of a sonotrode device in a vibration welding process.

BACKGROUND OF THE INVENTION

The process of vibration welding utilizes controlled oscillations or vibrations in a particular range of frequencies and directions in order to bond adjacent plastic or metal work pieces. Vibration welding can involve moving one or more work pieces under pressure while transmitting vibrations through the work pieces, thus creating surface friction. The surface friction ultimately generates heat and softens adjacent portions of the work pieces, ultimately bonding the work pieces.

In a vibration welding system, a weld horn or sonotrode is directly connected to or formed integrally with one or more weld heads. The weld head(s) may include one or more textured weld tips, i.e., the surface that physically contacts the work pieces that are being welded. Vibration welding has tremendous utility in industry, for example in the joining of various onboard components during the manufacturing of a vehicle. The efficiency, consistency, and reliability/durability of a welded part, including but not limited to the battery module for a vehicle, depends largely on the methodology and welding tools used to form the various welded joints in the welded part.

SUMMARY OF THE INVENTION

Accordingly, an optimized vibration welding method and system are provided herein, with active material elements used in a particular manner to optimize desirable qualities of a welded joint. Active material (AM) elements, e.g., Shape Memory Alloys (SMAs) or other shape memory materials, piezoelectric materials, etc., whether activated by a voltage, heat, stress, or otherwise, are used to augment the welding system. The AM elements are positioned somewhere on the welding system, e.g., adjacently to a welding interface either directly or at least partially within a recess of an individual weld tip and/or a welding anvil, and used to independently control and regulate a welding force exerted by each weld tip. The AM elements may be used to construct, for example, a generally flat mat or pad, a network of interconnected cells of any shape, a solid-walled or hollow-walled tube, a solid cylinder, coil, etc., with the term AM element being used herein to refer to, without necessarily being limited to, the SMAs and piezoelectric materials as described herein, as well as electroactive polymers (EAPs), magnetostrictive materials, electrostrictive materials, etc.

The AM elements facilitate production and/or maintenance of regulated welding forces within a predetermined displacement range of each of the weld tips. Depending on the particular AM element used, the weld tips may be able to overcome tool setup errors, work piece geometric/dimensional variation, as well as uneven spot indentations during the vibration welding process. In one embodiment, welding forces of multiple weld tips may be automatically regulated, i.e., increased, decreased, and/or maintained, as a function of heat generated from the welding process, e.g., during an ultrasonic welding process.

The method and system can be used in a host of vibration welding processes, including but not limited to ultrasonic welding, wherein surfaces of one or more work pieces are joined together at or along a welding interface using an applied pressure and controlled mechanical vibration. One type of vibration-welded product or assembly is a vibration-welded multi-cell battery module suitable for use as a propulsive power source aboard a hybrid electric vehicle (HEV), a plug-in HEV (PHEV), an electric vehicle (EV), or any other vehicle using a battery for at least part of its propulsive energy. However, those of ordinary skill in the art will recognize that the range and type of vibration-welded products that stand to benefit from the present invention, whether vehicular or non-vehicular in nature, are practically unlimited.

In vibration welding, a single horn or sonotrode may have one or several weld heads connected to or formed integrally with the sonotrode, with each weld head having one or more weld tips producing a weld. Since the weld tips typically have pre-machined dimensions and are rigidly mounted on the sonotrode via its associated weld head, the welding forces generated at a given one of the weld tips may vary from the welding forces generated at each of the other weld tips. Moreover, the welding forces may be difficult to predict or control due to such factors as tool misalignment, geometric tolerances, and/or weld zone collapse due to the localized heat that is generated by the welding process.

Therefore, AM elements may be positioned on the various components of the welding system, e.g., the sonotrode, weld head, weld tips, and/or the welding anvil. In one embodiment, the AM elements are positioned adjacently to the welding interface, e.g., connected to or disposed within a recess of the weld tips and/or the welding anvil, such that each of the weld tips are independently capable of having a regulated or prescribed welding force without having to rely on a sophisticated mechanical controller. However, those of ordinary skill in the art will recognize that AM elements can be used at positions on the welding system not adjacent to the welding interface depending on the level of regulation desired, without departing from the intended scope of the invention.

In particular, a method is provided herein for controlling or regulating welding forces imparted by a welding system, e.g., a weld tip to a welding interface of a work piece, during a vibration-welding process. The method includes positioning at least one AM element adjacently to the welding interface, e.g., on or within a weld tip and/or welding anvil, and then selectively varying a property of the AM element, i.e., varying the property actively and/or passively via a stimulus, to thereby regulate the welding force applied by the weld tip(s) to a work piece during the vibration-welding process.

In particular, a method is provided herein for regulating a welding force imparted by a vibration welding system having a sonotrode, a welding anvil for supporting a work piece, a weld head, and a weld tip adapted for forming a welded joint at a welding interface of the work piece in response to an oscillation of the sonotrode and the weld head. The method includes positioning at least one AM element on the vibration welding system, including at a position that is adjacent to the welding interface, and varying a property of the AM element to thereby regulate the welding force within a predetermined displacement range of the weld tip at the welding interface.

A vibration welding system includes a weld head having a weld tip and an AM element positioned adjacently to the welding interface as noted above. The system is adapted to regulate a welding force applied by the weld tip(s) to a surface of a work piece during the vibration-welding process, doing so by passively or actively varying a property of the AM element, e.g., a dimension and/or a stiffness thereof.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic perspective illustration of a sonotrode assembly having a plurality of weld heads, weld tips, and Active Material (AM) elements according to one embodiment;

FIG. 3 is a schematic perspective illustration of a multi-cell battery module that may be vibration-welded using the system of FIG. 1;

FIG. 4A is a schematic perspective illustration of a piezoelectric stack that is usable as the AM element within the system of FIG. 1;

FIG. 4B is a schematic perspective illustration of a Shape Memory Alloy (SMA)-based AM element according to another embodiment;

FIG. 4C is a schematic perspective illustration of an SMA-based AM element according to yet another embodiment;

FIG. 4D is a schematic perspective illustration of an SMA-based AM element according to yet another embodiment;

FIG. 4E is a schematic illustration of an SMA-based AM element according to yet another embodiment;

DESCRIPTION OF THE PREFERRED EMBODIMENTS

Figure 1:
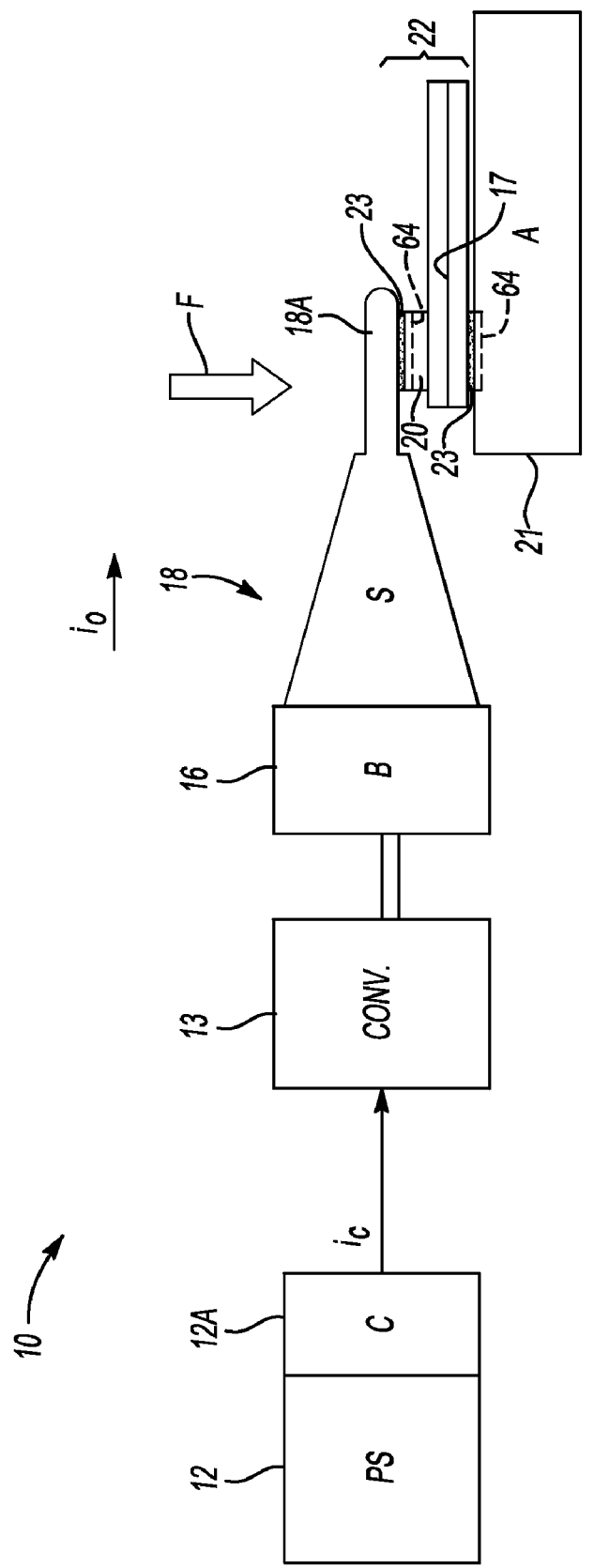
FIG. 1 is a schematic side view illustration of a vibration welding system usable in accordance with the invention.

Referring to the drawings, wherein like reference numbers refer to like components, and beginning with FIG. 1, a vibration welding system 10 is adapted to optimize a welded joint formed using ultrasonic welding or another vibration-welding process. The system 10 utilizes Active Material (AM) elements 23 to passively and/or actively regulate the welding force applied to a surface of a work piece being welded as explained below. As used herein, the term "AM element" refers to piezoelectric materials and Shape Memory Alloys (SMA) having a variable property, e.g., length, thickness, stiffness, etc., whether activated by stress, heat, voltage, or otherwise. AM elements may also include field-activated magnetostrictive or electrostrictive materials, etc., as explained below. The AM elements facilitate production and/or maintenance of regulated welding forces within a predetermined displacement range of one or more weld tips 20 as explained below. Coil springs, leaf springs, or other mechanical spring devices (not shown) may also be used in addition to the AM elements 23 depending on the intended design. Used alone, mechanical springs may also have an effect on the welding forces. However, the unique ability to select, predict, and ultimately vary properties of the AM element 23 in a predictable manner allow for the precise regulation of welding forces within the system 10.

The vibration welding system 10 may include a welding power supply (PS) 12 that is operable for transforming an available source power into a form more readily useable for or conducive to vibration welding. As will be understood by those of ordinary skill in the art, a power supply used for vibration welding, such as the power supply 12 of FIG. 1, can be electrically-connected to any suitable energy source, e.g., a 50-60 Hz wall socket. The power supply 12 may include a weld controller (C) 12A, usually but not necessarily integrally included within the power supply. The power supply 12 and weld controller 12A transform the source power into a suitable output signal, i.e., an electrical control signal (arrow $i_C$), having a predetermined waveform characteristic(s) suited for use in vibration welding, for example a frequency of several Hertz (Hz) to approximately 40 KHz, or much higher frequencies depending on the particular application.

Still referring to FIG. 1, the electrical control signal (arrow $i_C$) is transmitted from the power supply 12, or more precisely from the weld controller 12A, to a converter (CONV) 13 having the required mechanical structure for producing a mechanical vibration or oscillation (arrow $i_O$) of welding head 18A. Welding head 18A is integrally-formed with a welding horn or sonotrode (S) 18, with the mechanical oscillation (arrow $i_O$) generated in response to the control signal (arrow $i_C$). The mechanical oscillation (arrow $i_O$) may be described by the various waveform characteristics thereof in terms of both the direction of oscillation and the amplitude and frequency/wavelength.

The vibration welding system 10 may also include a booster (B) 16 adapted for amplifying the amplitude of vibration, and/or for changing the direction of an applied force (arrow F) as described below. That is, the mechanical oscillation (arrow $i_O$) may initially have a relatively low amplitude, e.g., a fraction of a micron up to a few millimeters, which can then be amplified via the booster 16 to produce the required mechanical oscillation. The mechanical oscillation (arrow $i_O$) is in turn transmitted to each weld head 18A, with the sonotrode 18 and the weld heads thereof being directly coupled to the booster 16.

The weld head 18A that is operatively connected to or formed integrally with the sonotrode 18 is the actual vibrating or oscillating device used in the welding system 10 to form a vibration-welded joint in conjunction with an applied force. The applied force (arrow F) may be applied by an external mechanism (not shown), and/or can be applied by the booster 16. A welded joint is formed in proximity to an interface 17 between each of the work pieces 22. The system 10 may be used to weld or join metals or thermoplastics, as is well understood in the art, by varying the orientation of the vibrations emitted by the sonotrode 18. That is, for thermoplastics the vibrations emitted by the sonotrode 18 tend to be perpendicular to the surface being welded, while for metals the direction may be generally tangential thereto.

Still referring to FIG. 1, each weld head 18A is directly attached to one or more weld tips 20, i.e., the surface of the weld head actually contacting the surfaces of work pieces 22 during formation of the vibration-welded joint at or along the interface 17. The weld tip 20 may be textured or configured to include knurls, teeth, and/or other frictional patterns or features to provide a sufficient grip on the work pieces 22. To further facilitate the vibration welding process, one or more of the work pieces 22 may be positioned on a stationary surface or a welding anvil 21.

Within the scope of the present invention, an AM element 23 may be disposed adjacently to the work piece 22 to facilitate production and/or maintenance of regulated welding forces within a predetermined displacement range of each of the weld tips 20, as noted above. For example, the AM element 23 may be connected to a surface of the weld tip 20 between the weld tip and the weld head 18A, embedded or contained at least partially within the weld tip, or connected to a surface of the welding anvil 21. Alternately, the AM element 23 may be disposed within a recess 64 (also see FIGS. 5 and 6) of the weld tip 20 and/or the welding anvil 21 of FIG. 1, an embodiment which may facilitate the removal and replacement of the AM element as explained below.

In a conventional vibration welding system that does not utilize the self-adjusting capabilities of the AM elements 23 as set forth below, tool misalignment may account for some weld failures, with other weld failures potentially resulting from factors such as resonance, over/under welding, edge welds, etc. In such systems, a single sonotrode with multiple weld heads moves up and down in unison to form the welded joint. That is, weld force, e.g., of each weld tip 20, may not be independently controlled or regulated at each weld head in an optimal manner.

Referring to FIG. 2, the sonotrode 18 of FIG. 1 may be configured with multiple weld heads 18A. For simplicity of illustration, the sonotrode 18 is shown in block form, however any sonotrode shape may be used without departing from the intended scope of the invention. While three weld heads 18A are shown in FIG. 2 for illustrative purposes, more weld heads or as few as one weld head may also be used. Each weld head 18A having at least one weld tip 20 may be configured with the same shape/pattern or with different shapes/patterns as desired.

However configured, a corresponding AM element 23 may be connected to or disposed within each weld tip 20, i.e., positioned between the weld head 18A and the weld tip. As will be understood by those of ordinary skill in the art, each weld head 18A can oscillate or vibrate in a predetermined linear direction relative to a plane of the work pieces being welded, i.e., work pieces 22 of FIG. 1. The weld head 18A of FIG. 2 can therefore be vibration-controlled to form a welded joint via the weld tips 20, with the use of active materials in the form of the AM elements 23 further optimizing the qualities of the welded joint by independently regulating the welding forces applied at each weld tip.

As used herein, and as will be understood by those of ordinary skill in the art, the term "active materials" refers generally to material compositions having certain actively or passively variable properties, such as stiffness, shape, dimensions, and/or material morphology or structure, that may be modified, either passively or actively, by an external stimuli or activation signal. Such stimuli may include, without being limited to, an applied electrical and/or magnetic field(s), photo-chemical activation, external stresses, temperature fluctuations, moisture, and/or pH changes, or combinations thereof.

For example, a voltage source such as the energy storage system (ESS) 112 of FIG. 2 or the power supply 12 of FIG. 1 may be selectively connected to the AM elements 23 to drive an electrical current through a conductor within or in proximity to an associated active component or element to generate the necessary heat for inducing a solid-state phase transformation, and/or to induce an electric and/or magnetic field around an active element, depending upon the application and the particular active material-based component.

Although many active materials may be useable within the scope of the present invention, a few types of active materials for use as the AM elements 23 are mentioned here by way of example. Electro-Active Polymers (EAPs) are polymeric materials which respond in a particular manner to external electrical stimulation, such as an applied voltage, by a change of shape and/or size. Consequently, EAPs are capable of converting electrical energy to a mechanical force and/or movement, and vice versa. EAPs may be divided in two primary classes: dielectric EAPs, in which actuation is caused by electrostatic forces between two electrodes which squeeze the polymer, and ionic EAPs, in which actuation is caused by the conformational changes produced by the displacement of ions inside the polymer.

Shape memory alloys (SMAs) are also usable as the AM elements 23. Such materials or compositions exhibit shape memory, and thus have the ability to "remember" their original shape. The original shape may be recalled subsequent to a deformation that changes its shape by applying an external stimulus (i.e., an activation signal). As such, deformation of the shape memory material from the original shape can be a temporary and reversible condition. These capabilities are due in part to a temperature and stress-dependent solid-state change of phase due to a cooperative atomic rearrangement.

The two phases are the Martensite (m) phase and the Austenite (a) phase, which refer to the lower and higher temperature phases, respectively, in which the phase transformation occurs from a low-symmetry (Martensite) to a highly symmetric (Austenite) crystallographic structure. SMA components represent a class of thermally-activate materials that can undergo a reversible phase transformation responsible for stress-induced and temperature-induced recoverable deformation behavior. Stress-induced superelasticity properties of certain SMAs when in the Austenitic phase may be used for producing a constant force over a wide range of strain, e.g., up to approximately 8%, providing an alternate embodiment to thermally-activated shape memory and modulus change effects. The AM element 23 may therefore be, in one embodiment, an SMA element acting in its superelasticity range. In such an embodiment, varying a property, e.g., a dimension or a stiffness of the SMA element, still maintains the welding force at the welding interface 17 of FIG. 1 at an approximately constant level.

The AM elements 23 may also be constructed of piezoelectric materials. Such materials are traditionally crystalline structures and ceramics, which produce a voltage when a mechanical stress is applied thereto. Since this effect also applies in the reverse manner, a voltage applied across a sample piezoelectric material will produce a mechanical stress within the sample. For example, activation of a piezoelectric material can result in a change in dimension of approximately 0.1% for piezo-ceramics and 1% for piezo-polymers. Suitably designed structures made from these materials can therefore be made that bend, expand, or contract when a voltage is applied thereto.

Active materials may also be magneto-strictive or electro-strictive. The term "magneto-strictive" refers to the mechanical deformation that occurs in a ferromagnetic material when it is placed in a magnetic field. Active materials may therefore be selected with desired magneto-strictive properties so that they may change a dimension such as but not limited to their length or thickness in a desired fashion when subjected to an induced electromagnetic field. Likewise, electro-strictive materials may change their stiffness or strain in response to an applied voltage.

Referring to FIG. 3, according to one embodiment a weld head 118A may be used to weld work pieces 122 embodied as a set of tabs 38A, 38B of a multi-cell battery 30, and an elongated interconnecting member 32. Interconnecting member 32 may be constructed of a suitable conductive material, and may be shaped, sized, and/or otherwise configured to form a rail or bus bar, and mounted to an interconnect board (not shown) of the battery 30. For simplicity, only the portions of the battery 30 extending above an imaginary plane 36 are shown in FIG. 3.

Potential uses for the battery 30 include but are not limited to the powering of various onboard electronic devices and propulsion in a hybrid electric vehicle (HEV), an electric vehicle (EV), a plug-in hybrid electric vehicle (PHEV), and the like. By way of example, the battery 30 could be sufficiently sized to provide the necessary voltage for powering an electric vehicle or a hybrid gasoline/electric vehicle, e.g., approximately 300 to 400 volts or another voltage range, depending on the required application.

The battery 30 may include a plurality of battery cells each having a positively-charged terminal or tab 38A and a negatively-charged terminal or tab 38B. The particular tabs 38A, 38B that are positively and negatively-charged may be reversed from the configuration shown in FIG. 3 without departing from the intended scope of the invention, i.e., with tabs 38A being negatively-charged and tabs 38B being positively-charged. Whatever their respective charges, the tabs 38A, 38B are electrode extensions of a cell, and are each internally-welded to the various anodes and cathodes comprising that particular cell, as will be well understood by those of ordinary skill in the art.

Referring to FIG. 4A, one type of AM element 23 usable with the system 10 of FIG. 1 is a piezoelectric stack 123. The piezoelectric stack 123 may be configured as a cylinder or stack of piezoelectric cells 57, the stack having a de-energized or inactivated length (L) that increases by a length (ΔL) when activated by a source, e.g., the power supply 12 of FIG. 1, the ESS 112 of FIG. 2, or another suitable energy source. An end 52 of piezoelectric stack 123 may be connected to or positioned adjacently to the weld tip 20 (see FIGS. 1, 5, and 6), and another end 54 may be likewise connected to or positioned adjacently to the weld tip. The piezoelectric stack 123 may be wound with a length of wire or conductive coil 56, which in turn may be connected to the power supply 12 of FIG. 1 or other energy source as noted above.

In operation, the controller 12A of FIG. 1 may ramp up the voltage supplied to the coil 56 until the weld tip 20 of FIG. 2 touches a surface of the work pieces being welded. Based on weld pressure requirements, an additional voltage may be applied to the piezoelectric stack 123 and thereafter adjusted as needed based on a predetermined control variable, e.g., a desired pressure vs. time characteristic. As each piezoelectric stack 123 may be positioned with respect to a separate weld tip 20, each weld tip and associated weld head 18A may apply a welding force that is independently-adjustable with respect to the other weld heads of the same sonotrode 18 (see FIG. 1). Here, each weld head is shown with one weld tip 20. In the case of one weld head having multiple weld tips 20, then the welding force between different weld tips can be independently regulated/adjusted.

Referring to FIG. 4B, another type of AM element that is usable with the system 10 of FIG. 1 is a shape memory alloy (SMA) pad 223. Of the many available active materials, certain SMAs may have a wide super-elastic deformation range at constant pressure, e.g., at sufficiently elevated temperatures above an Austenite finish temperature, as will be understood in the art. SMA may also provide the advantage of superior power density, steady performance even in a harsh operating environment, simplicity in actuation, silent and smooth motion, and auto-sensing capability.

The SMA pad 223, as with the substantially flat and rectangular SMA pad design shown for the AM element 23 shown in FIG. 2, may be constructed of nickel titanium (NiTi) or another suitable alloy material, with other elements added to make a high transition temperature alloy if a high transition temperature is desired in a particular application. The actual transition temperature may be tuned by composition and training, as is well understood in the art. In the particular embodiment shown in FIG. 4B, the SMA pad 223 may be constructed of a lattice-like network of linked SMA cells 58 each configured as a ring, a tube, or a washer. Other variants may include a honeycomb design, i.e., the shape of each of the SMA cells 58 is not necessarily circular as shown, but may be square, hexagonal, pentagonal, triangular, etc., in order to produce the desired response.

Also as shown in FIG. 4B, a cooling device 62, e.g., a fan, blower, etc., may be used to generate and direct cool air (arrows 11) onto the SMA cells 58 to rapidly cool the SMA pad 223 of FIG. 4B or any of its variants of FIGS. 4C-E, and to thereby facilitate a state or phase change via convection or otherwise when the SMA is a thermally-activated variant. While shown only in FIG. 4B for simplicity, cooling device 62 may be used with any of the embodiments set forth in FIGS. 4B-E, or with any other embodiment that might benefit from an assisted state change. Device 62 may also be configured as a temperature-regulated device adapted to blow air with a pre-set temperature to bring the regulated force to desired level, or simply for better temperature control.

Other possible embodiments of AM elements are shown in each of FIGS. 4C, 4D, and 4E. Referring first to FIG. 4C, an alternate SMA pad 323 may replace the SMA pad 223 of FIG. 4B, with a radial loading of a series of interconnected arcs 60 of pad 323 providing the required welding force adjustment capability. In FIG. 4D, an annular SMA pad 423 replaces the SMA pad 223 of FIG. 4B, with radial loading of a hollow ring-shaped or annular SMA tube providing the required welding force variance. FIG. 4E shows yet another annular SMA pad 523, with the SMA pad 523 formed as a solid and unitary SMA tube, and with radial loading provided via the solid annular SMA material thereof.

Other variants of the SMA elements of FIGS. 4B-4E are possible without departing from the intended scope of the invention. For example, one may use an SMA wire or tube forming a scroll or a projected cone-type spring, a series of SMA coil springs, porous SMA block, other active material-based elements such as those constructed of magnetostrictive or electrostrictive materials, etc.

Figure 5:
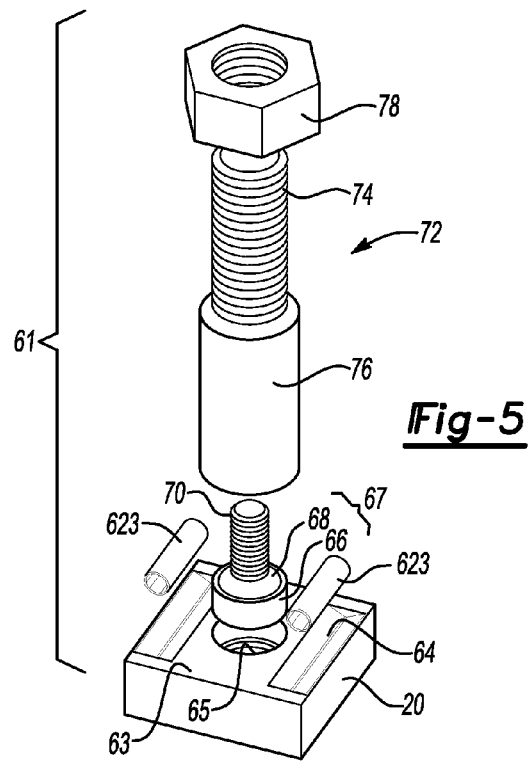
FIG. 5 is an exploded view perspective illustration of a weld tip assembly having AM elements according to yet another embodiment.
Figure 6:
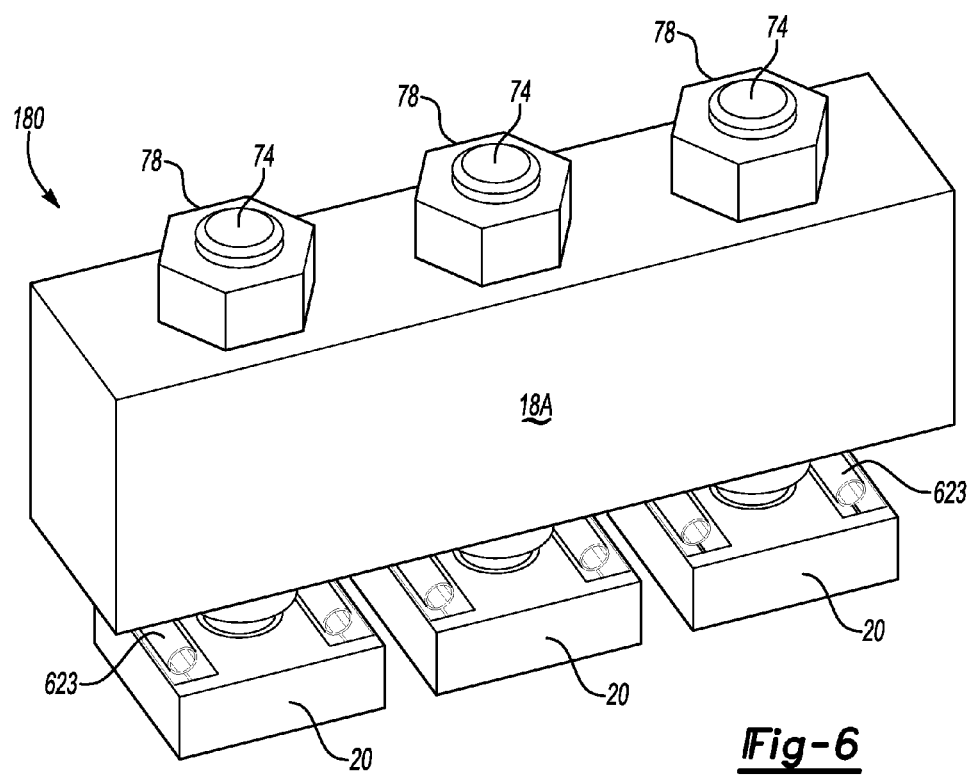
FIG. 6 is a perspective view illustration of a weld head assembly having weld tips as shown in FIG. 5.

Referring to FIGS. 5 and 6, a plurality of weld tip assemblies 61 (see FIG. 5) are shown as part of a weld head assembly 180 (see FIG. 6) to illustrate yet another possible embodiment of the present invention. Weld tip assembly 61 of FIG. 5 includes AM elements 623 disposed in a recess 64 formed in the weld tip 20, or in a recess formed in a surface of the welding anvil 21 facing the weld tip(s) as shown in FIG. 1. Weld tips 20 may be individually configured with the recesses 64 formed in a face 63 facing the weld head 18A as best shown in FIG. 6. Such a configuration may facilitate removal and replacement of the AM elements 623. In this embodiment, the AM elements 623 may be configured as any of the previously described materials, with the AM element 623 shaped generally as a cylinder as shown in FIGS. 5 and 6, i.e., a solid or porous cylinder, a coil spring, etc.

While shown as closed at both ends and wedge-shaped in FIG. 5, the recesses 64 may be round or of any other shape and/or open or closed end configuration facilitating installation and replacement of the AM elements 623. To enable rotation of the weld tips 20 as needed during vibration welding, face 63 of each weld tip may be configured to include a circular aperture 65 wherein a cup 66 is firmly engaged, e.g., press-fitted. Cup 66 in turn may be configured to receive a ball joint 67 having a ball portion 68 and a threaded shaft portion 70, with the ball portion freely rotating within the cup 66 as needed. Shaft portion 70 of the ball joint 67 may be threaded into a barrel portion 76 of a threaded bolt 72, with a threaded shaft portion 74 of the threaded bolt threaded to a nut 78 for rigid attachment of the weld head assembly 61 to the weld head 18A.

As shown in each of FIGS. 5 and 6, an equal number of AM elements 623 may be used with each weld tip 20, i.e., multiples of two, for force balancing during vibration welding, although an unequal number of AM elements or a single AM element may also be used depending on the intended application. While shown as cylinders in the embodiment of FIGS. 5 and 6, AM elements 623 may be configured as any suitable active material embodiment as set forth above, whether actively or passively activated. As will be understood by those of ordinary skill in the art, the present invention may be used for various joining technologies, including automatic compensation for tool misalignment in ultrasonic metal or plastics welding, resistance spot welding, self-piecing riveting, clinching, etc.

While the best modes for carrying out the invention have been described in detail, those familiar with the art to which this invention relates will recognize various alternative designs and embodiments for practicing the invention within the scope of the appended claims.

The invention claimed is:

1. A method for regulating a welding force imparted by a vibration welding system having a sonotrode, a welding anvil for supporting a work piece, a weld head, and a weld tip configured for forming a welded joint at a welding interface of the work piece in response to an oscillation of the sonotrode and the weld head, the method comprising:
positioning at least one Active Material (AM) element on the vibration welding system, including at a position that is adjacent to the welding interface, wherein the AM element is one of a piezoelectric material element, a Shape Memory Alloy (SMA) element, and an Electroactive Polymer (EAP) material element; and
varying a property of the AM element to thereby regulate the welding force within a predetermined displacement range of the weld tip at the welding interface.

2. The method of claim 1, wherein varying a property of the AM element includes varying a dimension of the AM element.

3. The method of claim 1, wherein positioning the AM element includes at least one of: positioning the AM element directly between the weld head and the weld tip, and positioning the AM element directly between the work piece and the welding anvil.

4. The method of claim 1, wherein varying a property of the AM element includes varying the property as a function of an amount of heat generated with respect to the system during a vibration-welding process.

5. The method of claim 1, including a voltage source, wherein varying a property of the AM element includes selectively applying a voltage from the voltage source to the AM element to thereby vary at least one of a length, a thickness, and a stiffness of the AM element.

6. The method of claim 1, wherein varying a property of the AM element includes independently and selectively varying a property of each of a plurality of AM elements.

7. The method of claim 1, wherein the AM element is a Shape Memory Alloy (SMA) element acting in its superelasticity range, and wherein varying a property of the AM element includes varying at least one of a dimension and a stiffness of the SMA element while maintaining the welding force at an approximately constant level.

8. A method for regulating a welding force imparted by a vibration welding system having a sonotrode, a welding anvil for supporting a work piece, a weld head, and a weld tip configured for forming a welded joint at a welding interface of the work piece in response to an oscillation of the sonotrode and the weld head, the method comprising:
positioning an Active Material (AM) element adjacently to the welding interface, wherein the AM element is one of a piezoelectric stack, an Electroactive Polymer (EAP) material element, and a Shape Memory Alloy (SMA) element; and
varying a property of the AM element, either actively or passively, to thereby regulate the welding force at the welding interface within a predetermined displacement range of the weld tip;
wherein positioning an AM element includes one of:
directly connecting the AM element to at least one of the weld tip and the welding anvil, and inserting the AM element into a recess defined by at least one of the weld tip and the welding anvil.

9. The method of claim 8, including positioning the SMA element, wherein the SMA element is one of: a network of linked SMA cells, a plurality of interconnected SMA arcs, a hollow annular SMA tube, and a solid annular SMA tube.

10. The method of claim 8, wherein varying a property of the AM element includes actively varying one of a stiffness and a dimension of the AM element using a voltage source.

11. The method of claim 8, wherein varying a property of the AM element includes passively varying the property using heat.

12. The method of claim 8, wherein the system further includes a cooling device, and wherein varying a property of the AM element includes selectively cooling the AM element using the cooling device.

13. A vibration welding system for forming a welded joint at a welding interface between surfaces of a work piece supported by a welding anvil during a vibration-welding process, the system comprising:
a weld head having at least one weld tip adapted to vibrate in response to an oscillation of a sonotrode, the weld tip having a predetermined displacement range; and
an Active Material (AM) element positioned adjacently to the welding interface, wherein the AM element is one of a piezoelectric stack, an Electroactive Polymer (EAP) material element, and a Shape Memory Alloy (SMA) element;
wherein the vibration welding system is configured to automatically vary a property of the AM element to thereby regulate a welding force imparted by the weld tip within the predetermined displacement range.

14. The vibration welding system of claim 13, wherein the work piece includes a conductive tab of a multi-cell vehicular battery.

15. The vibration welding system of claim 13, wherein the AM element is the SMA element acting in a superelasticity range, and wherein the SMA element is positioned adjacently to at least one of the weld tip and the welding anvil.

16. The vibration welding system of claim 13, wherein the AM element is configured as one of: the piezoelectric stack, a network of linked cells, a series of linked arcs, a hollow-walled tube, and a solid-walled tube.

17. The vibration welding system of claim 13, further comprising a cooling device that selectively cools the AM element to actively vary the property of the AM element.

18. The vibration welding system of claim 13, wherein the AM element is disposed within a recess defined by one of: a weld tip of the weld head and a welding anvil used to support the work piece during the vibration welding process.

* * * * *